UNITED STATES PATENT OFFICE.

GEORGE A. RICHTER, WALLACE B. VAN ARSDEL, AND DONALD H. WHITE, OF BERLIN, NEW HAMPSHIRE, ASSIGNORS TO BROWN COMPANY, OF BERLIN, NEW HAMPSHIRE, A CORPORATION OF MAINE.

WATER-REPELLENT COMPOSITION.

1,396,527.  Specification of Letters Patent.  Patented Nov. 8, 1921.

No Drawing. Original application filed September 13, 1919, Serial No. 323,624. Divided and this application filed May 26, 1920. Serial No. 384,406.

*To all whom it may concern:*

Be it known that we, GEORGE A. RICHTER, WALLACE B. VAN ARSDEL, and DONALD H. WHITE, citizens of the United States, residing at Berlin, in the county of Coos and State of New Hampshire, have invented new and useful Improvements in Water-Repellent Composition, of which the following is a specification.

This invention has for its object to provide an amorphous water-repellent composition which may be employed for waterproofing various articles of manufacture, either by saturating the same therewith, if they be of an absorbent nature, or coating them with a film or layer thereof, or in some instances both saturating and coating them.

Our composition consists of a compound of hard natural asphalt, (such as gilsonite), paraffin, and a suitable fixed oil, such as heavy petroleum oil. For example, we may compound these ingredients in about the following proportions by weight, namely:— gilsonite 40 to 50 parts, paraffin 35 to 50 parts and mineral oil 10 to 15 parts. These ingredients are placed in a suitable receptacle and are heated until the gilsonite is molten, and are thoroughly all intermixed. On cooling, they form a hard mass, having a melting point of about 130° to 140° F., which in thin layers is more or less flexible, not sticky or adhesive. If desired, a suitable volatile solvent, such as benzol, toluol, xylol or the like, may be employed therewith to form a paint for coating surfaces to be protected against moisture. On the other hand, by melting the mass, it may be used as a bath in which fibrous materials may be immersed for saturation or impregnation.

In the composition, the presence of paraffin or its equivalent (which has a solvent-action on gilsonite) greatly reduces its viscosity or increases its fluidity, when solved by heat, and moreover reduces the melting point of the composition. The proportion of paraffin or its equivalent may be increased or diminished in accordance with the use to which the composition is to be put or the density or porosity of the fibrous material with which it is to be impregnated. The presence of the oil likewise lowers the melting point of the composition and prevents its hardening into a brittle or crystalline mass. The presence of gilsonite is essential or desirable because of its waterproofing qualities, its high melting point, and the possible presence of any fine carbon particles. As a result of the admixture and blending of the three ingredients, there is secured a homogeneous non-sticky and wax-like product, at ordinary room temperatures, but which may be rendered highly fluid or relatively nonviscous when heated to relatively low temperatures.

The herein described composition of matter which when cold is hard, non-sticky and wax-like may be used in impregnating and coating fibrous tubes, as pointed out in our application Serial No. 323,624, filed September 13, 1919, of which this is a division. In said application, we have pointed out that fiber tubes may be stiffened and waterproofed, by first impregnating them with molten sulfur or its equivalent which is permitted to crystallize in the pores thereof, and then impregnating such tubes with the herein-described amorphous water-repellent compound.

When the composition is to be used for waterproofing fibrous materials which have not been first impregnated with sulfur, we may use the ingredients in such proportion as to produce a solid having a melting point of 120° to 150° F.,—namely, 5-10% mineral oil, 25-60% gilsonite and 25-70% paraffin.

What we claim is:

1. A water-repellent composition of matter, which is hard, non-sticky and wax-like at ordinary temperatures, and consists of a mixture of gilsonite, paraffin and a fixed oil, blended by heat.

2. A water-repellent composition of matter, consisting of about 25-60 parts of gilsonite, about 25-70 parts of paraffin, and about 5-10 parts of petroleum oil, all blended with heat, and having a melting point of 120°-150° F.

In testimony whereof we have affixed our signatures.

GEORGE A. RICHTER.
WALLACE B. VAN ARSDEL.
DONALD H. WHITE.